United States Patent [19]

Preisenhammer

[11] 4,044,623
[45] Aug. 30, 1977

[54] TOGGLE-LEVER POWER AMPLIFIER

[75] Inventor: Peter Preisenhammer, Kempten, Germany

[73] Assignee: Saurer-Allma GmbH Allgauer Maschinenbau, Kempten, Germany

[21] Appl. No.: 596,574

[22] Filed: July 16, 1975

Related U.S. Application Data

[63] Continuation of Ser. No. 441,579, Feb. 11, 1974, abandoned.

[30] Foreign Application Priority Data

Feb. 19, 1973    Germany ............................ 2308175

[51] Int. Cl.$^2$ ............................................. G05G 1/04
[52] U.S. Cl. ................................................... 74/520
[58] Field of Search ........................................ 74/520

[56]    References Cited
U.S. PATENT DOCUMENTS

| 2,751,159 | 6/1956 | Taylor, Jr. ............... | 74/520 |
| 2,841,032 | 7/1958 | Gimson et al. ............ | 74/520 |
| 2,960,278 | 11/1960 | Roubal ..................... | 74/520 |

FOREIGN PATENT DOCUMENTS 891,678  12/1943  France ........................... 74/520

Primary Examiner—Samuel Scott
Assistant Examiner—Wesley S. Ratliff, Jr.
Attorney, Agent, or Firm—Blanchard, Flynn, Thiel, Boutell & Tanis

[57] ABSTRACT

Toggle-lever construction especially for a vise or similar holding means. There is provided a toggle-lever construction in which one end thereof is backed against a suitable anchor device and the other end thereof bears against movable means such as the jaw of a vise. A relatively light force applied laterally of the toggle will produce a large force longitudinally thereof. In one embodiment the lateral force is applied by a longitudinally moving tapered screw. Wear on the toggle is minimized by providing rounded ends having substantially only a line contact between the components of the toggle with respect to each other and between the components of the toggle and the means engaging the respective free ends thereof.

15 Claims, 11 Drawing Figures

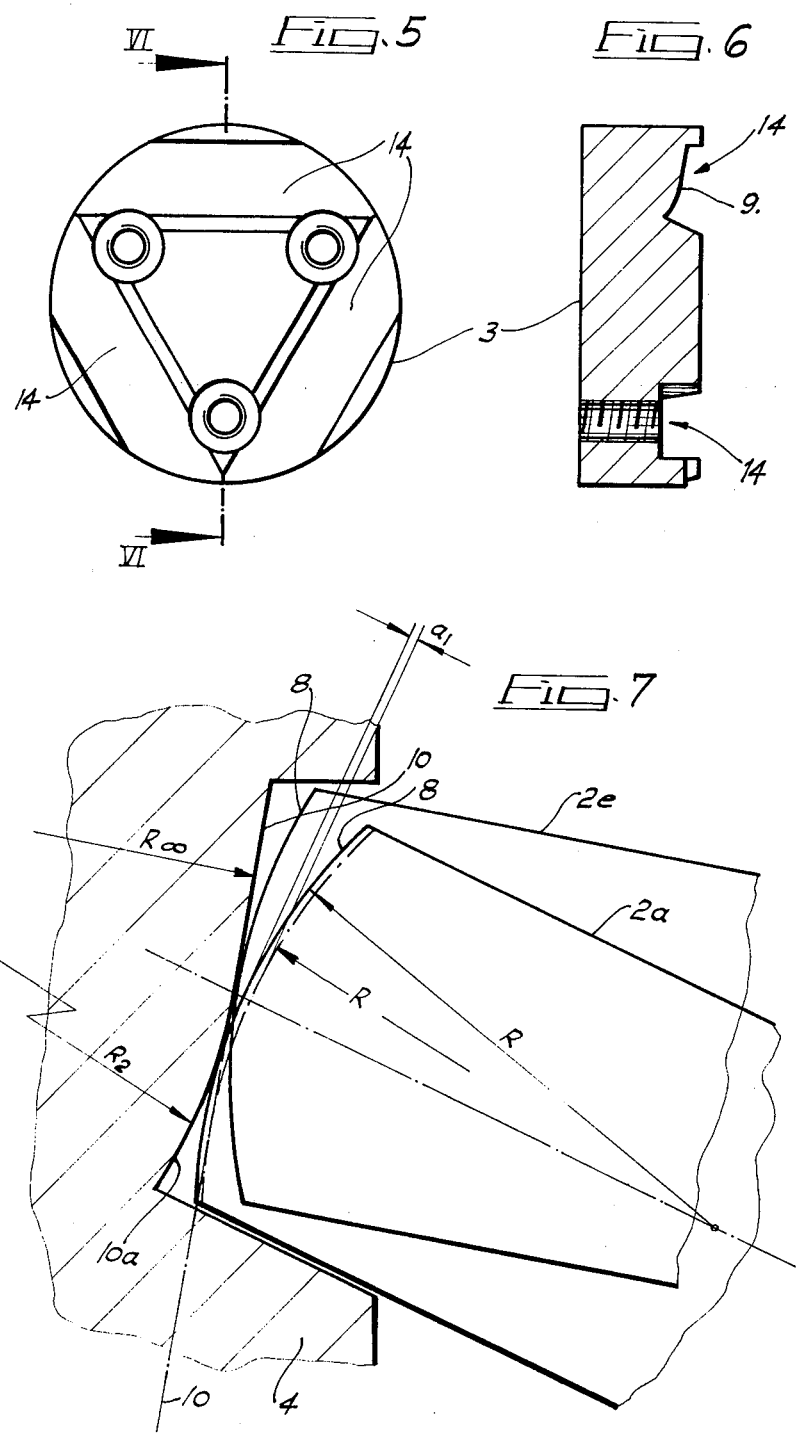

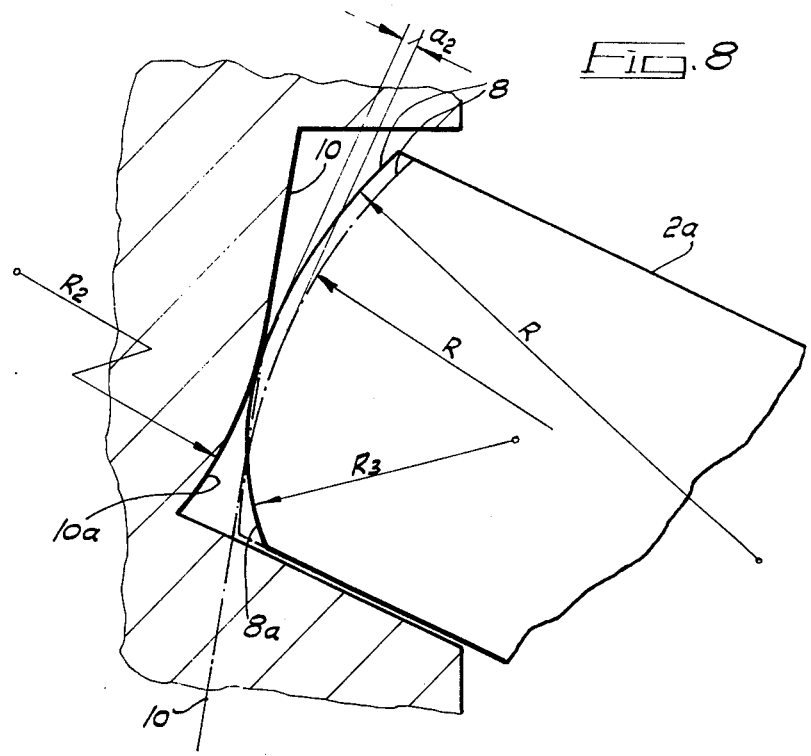
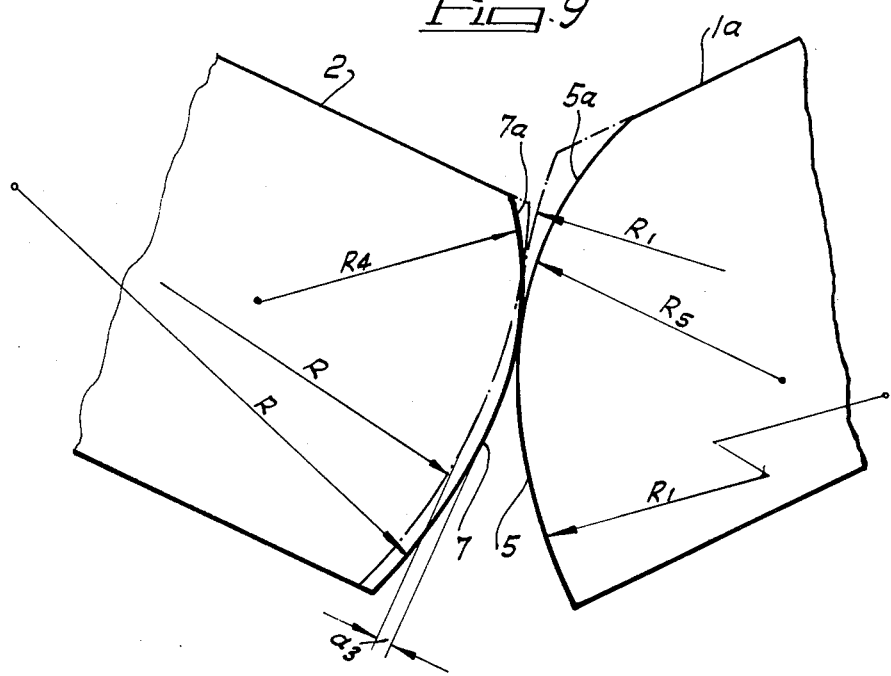

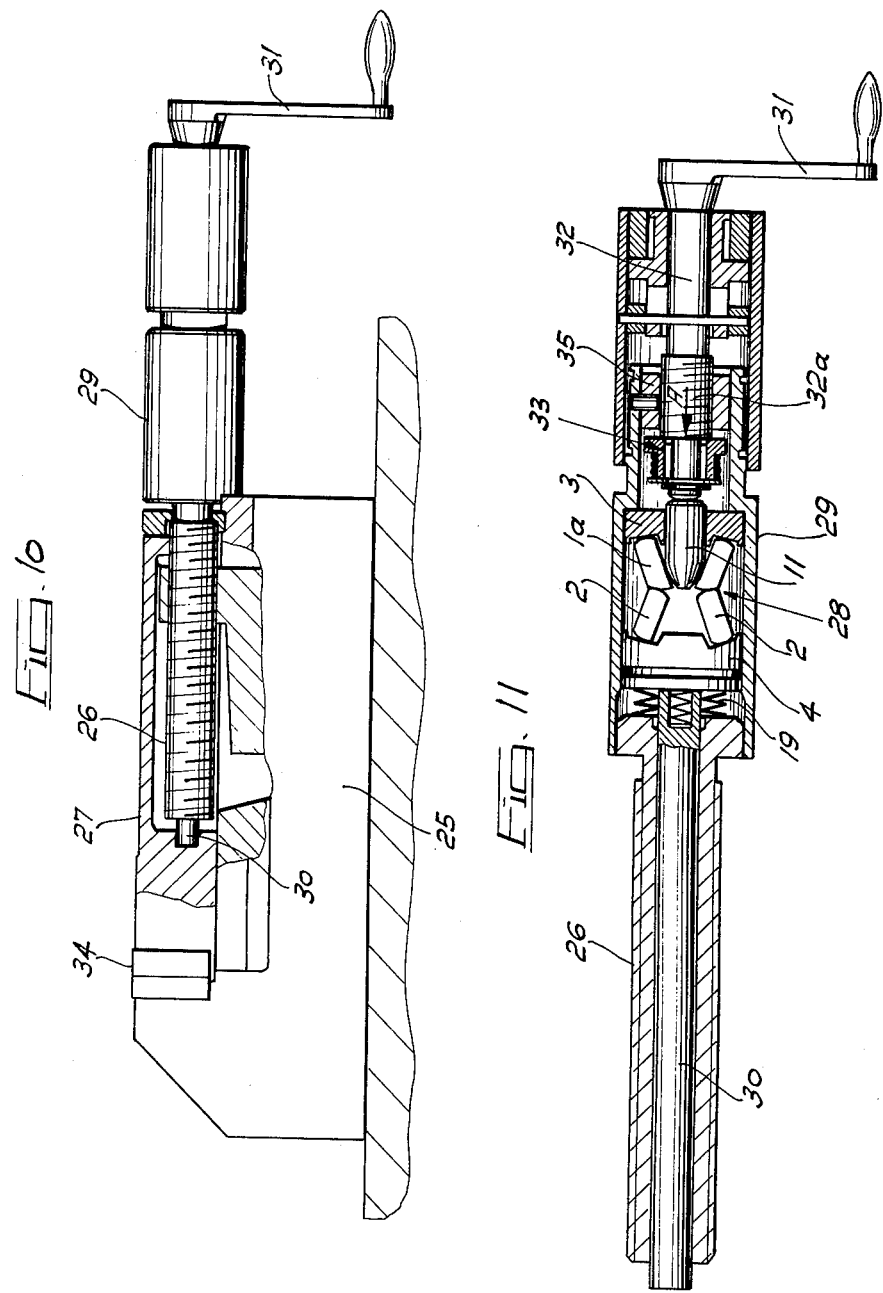

TOGGLE-LEVER POWER AMPLIFIER

This is a continuation, of application Ser. No. 441,579, filed Feb. 11, 1974, now abandoned.

FIELD OF THE INVENTION

The invention concerns a toggle-lever power amplifier having at least one toggle-lever pair, one of whose levers is supported on a stationary abutment and the other lever is supported on a movable pressure block forming the high-pressure part, a low-pressure part acting on the toggle with a force directed approximately perpendicularly to the said toggle.

BACKGROUND OF THE INVENTION

In known toggle-lever power amplifiers of this kind, the toggle levers are connected together and the toggle levers with abutment and pressure blocks are also connected together by joints. These toggle-lever power amplifiers have the disadvantage of expensive construction, while in addition the sliding friction occurring in all the aforesaid toggle-lever power amplifiers causes considerable wear, particularly in the case of compact construction of such a power amplifier with which high compressive forces are produced. With these prior toggle-lever power amplifiers, where the overall dimensions are small such as those fitted for example in the hollow spindles of machine vises only comparatively low compressive forces are produced.

The problem underlying the invention, in addition to eliminating the aforesaid disadvantages, is to provide a toggle-lever power amplifier of simple construction having exceptionally low wear, i.e. a very long life and which, in addition, although of small, compact construction, permits the production of very high compressive forces.

In a toggle-lever power amplifier according to the invention this problem is solved in that the two toggle-levers are supported directly on each other and also on abutment and pressure block, and all supporting surfaces are so formed that the co-operating supporting surfaces roll on each other with line contact during the movement of the toggle lever pair.

In this novel toggle-lever power amplifier, the above-mentioned joints and the accompanying sliding friction resulting in wear are non-existant. Since the supporting surfaces of the two toggle levers roll on each other and in the same manner the toggle levers also roll on pressure block and abutment, practically no wear occurs in these parts and in addition very high compressive forces can be produced without detrimental wear, even in the case of small, compact construction.

BRIEF DESCRIPTION OF THE DRAWINGS

The invention is described in the following with reference to the accompanying drawings which show a number of embodiment examples, and in which FIG. 5 is a view of a part of FIG. 2 seen in the direction V, FIG. 6 is a cross-section on line VI—VI of FIG. 5, FIGS. 7 - 9 show different advantageous forms of the rolling surfaces, FIG. 10 is a side view of a machine vise, partly in section, FIG. 11 shows on a larger scale the hollow spindle of the vice of FIG. 10 fitted with toggle-lever power amplifier.

DETAILED DESCRIPTION

Figure 1:
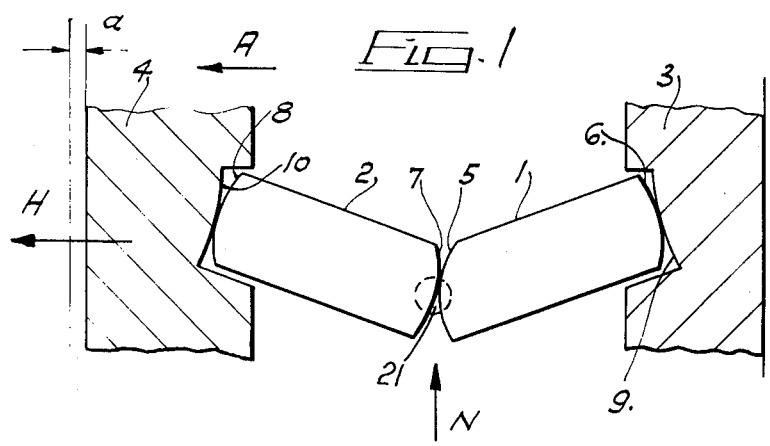
FIG. 1 shows diagrammatically a toggle-lever pair according to the invention.

FIG. 1 shows a toggle-lever power amplifier having a toggle lever pair comprising the two levers 1 and 2, in which lever 1 is supported on a stationary abutment 3 and the other lever 2 is supported on a pressure block 4 slidable in the direction A and forming the high-pressure part. With a force N, acting approximately perpendicularly on the toggle by means of a low-pressure part not shown, the toggle is extended so that by toggle-lever action the pressure block 4 is shifted through the distance $a$ and therefore a relatively large force H is produced.

As follows from FIG. 1, the two toggle levers 1 and 2 are supported directly on each other and also on abutment 3 and pressure block 4, the supporting surfaces being denoted by 5 to 10. All the supporting surfaces are so formed that the co-operating supporting surfaces 5, 7; 6, 9 and 8, 10 roll on each other with line contact during the movement of the toggle-lever pair.

The low-pressure part exerting the force N may act on the supporting lever 1 alone, but possibly however may act on both supporting members 1 and 2 in common.

In the advantageous embodiment of a toggle-lever power amplifier shown in FIGS. 2 to 6, three toggle-lever pairs are arranged symmetrically with respect to each other or concentrically, and between these toggle-lever pairs, whose toggle levers are denoted by 1a and 2, there is arranged as low-pressure part a spreader 11, having three oblique pressure surfaces 12 and acting in each case by means of a pressure surface on a toggle lever 1a, which will be called active lever. These pressure surfaces 12 of the spreader 11 and the counterpressure surfaces 13 on the active lever 1a are of such a shape that the available contact surface is as large as possible. The specific surface pressure is thereby reduced, and in this advantageous embodiment the toggle levers 1a, 2 have a rectangular cross-section with a relatively large width $b$ (FIG. 3), so that these spreading levers have considerable stability, and hence lateral outward buckling is impossible. This threefold arrangement of toggle-lever pairs have a large toggle-lever width $b$ also results in relatively broad supporting and rolling surfaces 5 to 8, so that no appreciable wear occurs during rolling on these broad rolling surfaces, even under considerable load.

In the advantageous embodiment shown, the pressure blocks 4 and abutments 3 are constructed in the form of cylindrical discs, and in one end side thereof, for forming the supporting and rolling surfaces 10 and 9, continuous rectilinear grooves 14 are provided (see FIGS. 5 and 6), which can be made in a simple manner by milling.

Figure 2:
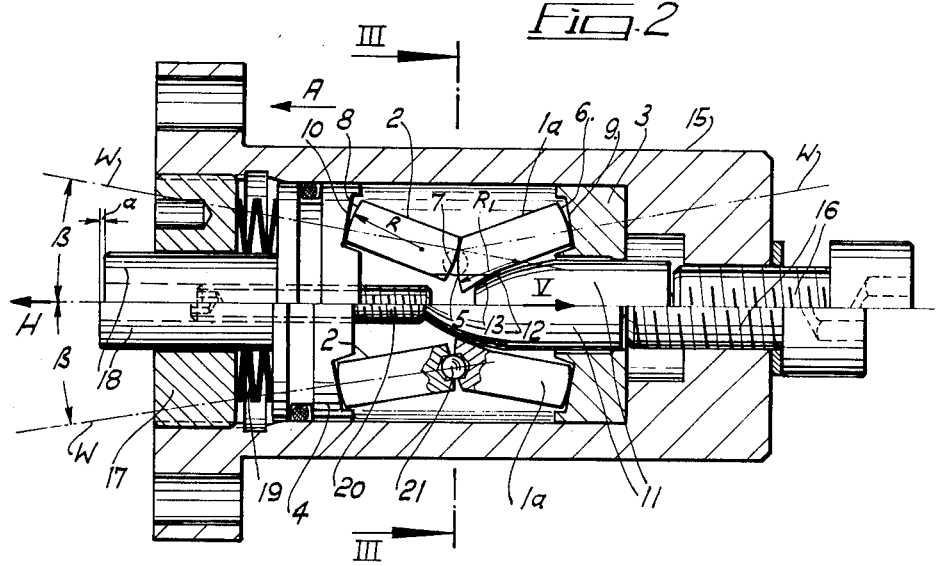
FIG. 2 is a longitudinal section through a first embodiment of a toggle-lever power amplifier having three toggle-lever pairs. The top half of this figure shows a toggle-lever power amplifier in the initial position (unstressed) and the bottom half of this figure shows the toggle-lever power amplifier in the end position (stressed)

As shown in FIG. 2, a cylindrical housing 15, receiving the power amplifier with these discs 3 and 4, is provided, as well as a pressure screw 16 passing through the base of the housing and acting on the spreader 11, and furthermore a pressure ring 17 closing the housing, in which ring is slidably mounted a pressure pin 18 rigidly connected to the pressure disc 4. Mounted between the pressure disc 4 and pressure ring 17 is a pressure spring 19, for example a plate spring pack, which after termination of the clamping operation presses the pressure disc with the toggle lever pairs and hence also the spreader 11 back into the starting position. For limiting the maximum pressure H, a limit stop, for example an adjustable screw 20, may be provided for the spreader 11.

To prevent mutual displacement of the toggle levers 1a, 2 in the unstressed condition, for securing these toggle levers in their mutual supporting position, respective steel balls 21 or the like are provided, being inserted loosely in corresponding bores of the rolling surfaces 5 and 7.

Figure 4:
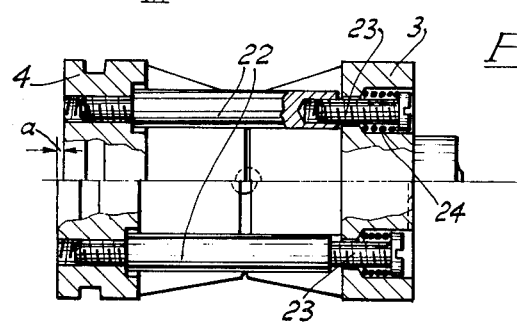
FIG. 4 is a view, partly in section, of parts of FIG. 2 assembled to form a unit.
Figure 3:
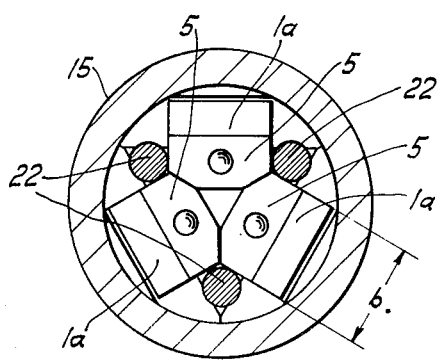
FIG. 3 is a cross-section on the line III—III of FIG. 2.

FIGS. 3 and 4 show that pressure disc 4 and abutment disc 3 are connected together by a number of axial pins 22 to form a unit such that these pins permit axial displacement of the pressure disc 4 relative to the abutment disc 3, the said pins 22 as shown in FIG. 3 serving at the same time for lateral guiding of the toggle lever pairs 1a, 2. In the embodiment shown, the pins 22 are screwed fast in the disc 4. A set screw 23, carrying a helical spring 24, is screwed into the free ends of the said pins, so that the disc 3 is urged permanently towards the pressure disc 4, and therefore this unit is held together in the unstressed condition.

FIG. 2 shows that the two rolling surfaces 7 and 8 of the toggle lever 2 have the same radius of curvature R whose center lies on the center line of the toggle lever. The rolling surface 6 of the active member 1a has the same radius of curvature. The center of the radius of curvature $R_1$ of the rolling surface 5 of the active member 1a, however, does not lie on the center line of the latter but on the contrary on what is called the active line W connecting together the points of contact of the rolling surfaces at the time. This active line makes with the center line of the power amplifier an angle $\beta$ which remains constant even when, during the spreading of the toggle lever pairs 1a, 2 by the spreader 11 during rolling, the points of contact of the rolling surfaces are displaced.

The power amplifier according to the invention may be used for many purposes, for example as tightening element in devices for clamping tables to machines, as clamping device for tools, for example tools on planning machines. The toggle-lever power amplifier may be used very advantageously in machine vises. This is illustrated in FIGS. 10 and 11, showing a machine vise 25, in which a hollow spindle 26 can be screwed for moving a slide 27. According to FIG. 11, the toggle-lever power amplifier according to the invention and indicated at 28 has a number of concentrically arranged toggle-lever pairs 1a, 2 mounted in a widened cylindrical extension 29 of the hollow spindle 26, a pressure rod 30 slidably mounted in the hollow spindle 26 and supported on the slide 27 of the vise being connected to the pressure block 4 in the form of a piston. The arrangement of the toggle-lever power amplifier fitted in this hollow spindle agrees substantially with the arrangement of FIG. 2, the bush-like housing 15 corresponding to the cylindrical spindle extension 29.

Actuation of the vise takes place in a known manner that is, a drive shaft 32 is rotated by means of a handle 31, and the hollow spindle 29, 26 is rotated by a torque clutch 33, so that the slide with its jaw 34 is moved up to the workpiece. The slide 27 then comes to a standstill so that on further rotation of the handle 31 the torque clutch 33 is disengaged and hence the driving spindle 32a is screwed into the threaded part 35 of the spindle extension 29 and therefore this spindle is moved in the direction A. The spindle end thus acts on the spreader 11 of the power amplifier, thereby producing a high compressive force of the pressure rod 30.

In the embodiment shown as example in FIG. 2, the curved supporting surfaces 8 and 6 act on plane supporting surfaces 10 and 9 of the pressure block 4 and abutment 3. By displacement of the spreader 11 from the initial position (top longitudinal section of FIG. 2) to the end position (bottom longitudinal section of FIG. 2), the toggle lever pairs 1a, 2 are extended and hence the pressure bolt is shifted by the tightening stroke a.

In the case of one and the same overall size of power amplifier or of the unit shown in FIG. 4, this tightening stroke can now be increased by a special formation of the rolling surfaces (see FIGS. 7 to 9), and thus the maximum tightening force can be considerably increased. This is achieved by the rolling surfaces 10, 10a - 8, 8a, - 5, 5a - 7, 7a having different radii of curvature $R_\infty R_2 - RR_3 - R_1R_5 - RR_4$ in their rolling range such that in the initial power amplification, the co-operating rolling surfaces roll on one another with smaller radii of curvature and hence there is a greater displacement of the pressure plate 4, and with further power amplification, the co-operating rolling surfaces roll on each other with larger radii of curvature and hence a smaller displacement of the pressure plate occurs.

In FIG. 7, the position of a toggle lever in the initial and final position is shown at 2a and 2e, its rolling surface 8 having the radius of curvature R. If, now, the lower part 10a of the rolling surface of the pressure block 4 has a smaller radius of curvature $R_2$ compared with the larger radius of curvature $R_\infty$ of the upper part of this rolling surface, this results in an increase in the tightening stroke, corresponding to the displacement distance $a_1$ of the pressure block, as compared with the tightening stroke a when the entire rolling surface 10 of the pressure block is plane, i.e. when it has only the large radius of curvature $R_\infty$.

According to FIG. 8, a still greater increase in the tightening stroke — corresponding to the displacement distance $a_2$ — can now be obtained, in that the bottom part 8a (effective at the commencement) of the rolling surface of the toggle lever 2a has a smaller radius of curvature $R_3$ than the larger radius R of the upper rolling surface part 8.

According to FIG. 9, a tightening stroke increase, corresponding to the displacement distance $a_3$, can also be obtained by the rolling surfaces 7a and 5a of the toggle levers 2 and 1a having a smaller radius of curvature $R_4$ and $R_5$ than the larger radii of curvature R and $R_1$ of the rolling surfaces 7 and 5. In the final position of the toggle-lever pairs, this large radii of curvature are effective, so that the specific surface pressure is thus reduced.

The toggle-lever power amplifier according to the invention is remarkable for its simple construction comprising only a few parts, and in addition it permits simple assembly and dismantling, particularly if the toggle-lever pairs, pressure block and abutment are combined to form a replaceable unit. By means of this power amplifier, very high tightening forces can be produced with a small, compact construction so that it may be fitted advantageously in machine vises. The parts rolling on each other, i.e. the toggle-lever parts, pressure block and abutment, are made of hardened steel, as is also the spreader. Due to this hardness and the rolling principle, wear is so slight that this power amplifier has almost unlimited life. Since all the loaded parts moved against each other are accommodated in an enclosed space, the latter may be filled with lubricant, resulting in automatic permanent lubrication of these parts.

The toggle-lever power amplifier according to the invention has the additional advantage that the power stroke $a$ for increasing the pressure has a linear behaviour. This linearity of the pressure increase, however, only occurs if the radii of curvature R of the rolling surfaces on the toggle levers 1 and 2 are equal. If the rolling surfaces on the toggle levers have different radii of curvature, a slight variation of the pressure increase occurs, i.e. a slight variation from the linear pressure increase.

In the case of the prior toggle-lever power amplifiers mentioned at the outset, there occurs, in contrast to the above-mentioned linear pressure increase, a progressive pressure increase compared with the power stroke, i.e. with increasing power stroke a considerably greater pressure increase occurs compared with the linear pressure increase.

I claim:

1. A toggle-lever power amplifier comprising a central axis and a plurality of toggle-lever pairs symmetrically and concentrically arranged around said axis, one of whose levers is supported on a stationary abutment means and whose other lever is supported on a movable pressure block means forming the high-pressure part, a low-pressure part having inclined pressure surfaces engaging in each case a counter-pressure surface on one toggle-lever of each of said toggle-lever pairs, said low-pressure part being positioned between these toggle-lever pairs and slidable in the direction of movement of said pressure block means and acting on said counter-pressure surface on said one toggle with a force directed approximately perpendicular to said one toggle, said two toggle-levers of each pair being supported directly on one another and on said stationary abutment means and said pressure block means and all supporting surfaces roll on one another with line contact during the movement of said toggle-lever pairs, each of said supporting surfaces on said toggle-lever pairs which roll on one another having means defining a recess therein and a roller element is loosely received in said recess while maintaining the support between said supporting surfaces which roll on one another.

2. A toggle-lever power amplifier according to claim 1, wherein each of said toggle-levers have a rectangular cross section.

3. A toggle-lever power amplifier according to claim 1, wherein said plurality of toggle-lever pairs comprises three toggle-lever pairs.

4. A toggle-lever power amplifier according to claim 1, wherein said pressure block means and said stationary abutment means are each formed as cylindrical discs having continuous, rectilinear grooves in one end side thereof to define said supporting surface thereon.

5. A toggle-lever power amplifier according to claim 1, wherein said pressure surface on said low-pressure part and the counter-pressure surfaces on said one toggle-lever are shaped to define a maximum contact therebetween.

6. A toggle-lever power amplifier according to claim 1, wherein said roller element is a ball.

7. A toggle-lever power amplifier according to claim 1, wherein each end surface on each of said toggle-levers have different radii of curvature so that in the initial power amplification, the end surfaces roll on one another with smaller radii of curvature and hence effecting a greater displacement of said movable pressure block means, and in the subsequent power amplification, said end surfaces roll on one another with larger radii of curvature and hence effect a smaller displacement of said movable pressure block means.

8. A toggle-lever power amplifier according to claim 1, wherein said pressure block means and said abutment means are connected to one another by a plurality of axial pins to form a unit so that said pins permit an axial displacement of said pressure block means relative to said abutment means, said pins serving at the same time for lateral guiding of said toggle-lever pairs.

9. A toggle-lever power amplifier according to claim 8, wherein said support unit is mounted in a cylindrical extension of a hollow spindle of a machine vise and includes a pressure rod slidably mounted in said hollow spindle and supported on a slide of said vise which is connected to said pressure block means.

10. A toggle-lever power amplifier according to claim 8, including a cylindrical housing for said unit having said pressure block means and abutment means therein, a pressure screw passing through a base of the said housing and engaging said low-pressure means, a pressure ring having an opening therethrough for closing said housing and a pressure pin slidable in said opening in said pressure ring and being rigidly connected to said pressure block means and a pressure spring mounted between said pressure block means and said pressure ring.

11. A toggle-lever power amplifier according to claim 1, wherein said supporting surfaces on both ends of the other of said toggle-levers have radii of curvature which are equal in magnitude.

12. A toggle-lever power amplifier according to claim 1, wherein said supporting surfaces on the ends of each of said toggle-levers are convex surfaces.

13. A toggle-lever power amplifier according to claim 12, wherein said supporting surfaces on said abutment means and on said pressure block means are planar surfaces.

14. A toggle-lever power amplifier according to claim 12, wherein said supporting surfaces on said abutment means and on said pressure block means are convex surfaces.

15. A toggle-lever power amplifier for use between stationary abutment means and movable pressure block means, comprising:

a plurality of pairs of elongated toggle levers symmetrically arranged with respect to one another and concentrically with respect to the longitudinal axis of said power amplifier, the toggle levers of each pair being in direct engagement with one another at the mutually common ends thereof, the opposite end of one of said toggle levers engaging said stationary abutment means, the opposite end of the other of said toggle levers engaging said movable pressure block means;

roll surface means on said ends of each of said toggle levers and on said stationary abutment means and said movable pressure block means for causing a rolling line contact at said locations of engagement therebetween during relative movement between said toggle levers and said stationary abutment means and said movable pressure block means, said roll surface means facilitating a friction free rolling of said toggle levers against each other at said common end, each of said roll surface means at said common end on said toggle-levers of each pair having means defining a recess therein and a roller element loosely received in said recess while maintaining said friction-free rolling of said toggle-levers against each other at said common end;

low pressure means engaging said one of said toggle levers in each toggle-lever pair and applying a force thereto which is substantially perpendicular to the longitudinal axis of said one of said toggle levers upon a movement of said low-pressure means relative to said one of said toggle levers; and support means for supporting said low-pressure means for movement relative to said one of said toggle levers of each toggle-lever pair.

* * * * *